(12) United States Patent
Nakano

(10) Patent No.: US 11,028,934 B2
(45) Date of Patent: Jun. 8, 2021

(54) PRESSURE CONTROL APPARATUS

(71) Applicant: NIDEC TOSOK CORPORATION, Kanagawa (JP)

(72) Inventor: Takeshi Nakano, Kanagawa (JP)

(73) Assignee: NIDEC TOSOK CORPORATION, Kanagawa (JP)

( * ) Notice: Subject to any disclaimer, the term of this patent is extended or adjusted under 35 U.S.C. 154(b) by 27 days.

(21) Appl. No.: 16/558,320

(22) Filed: Sep. 3, 2019

(65) Prior Publication Data
US 2020/0072370 A1 Mar. 5, 2020

(30) Foreign Application Priority Data
Sep. 3, 2018 (JP) .............................. JP2018-164726

(51) Int. Cl.
| | |
|---|---|
| *F16K 11/07* | (2006.01) |
| *F16H 61/00* | (2006.01) |
| *F16K 27/04* | (2006.01) |
| *F16H 57/04* | (2010.01) |

(52) U.S. Cl.
CPC ....... *F16K 27/041* (2013.01); *F16H 57/0447* (2013.01); *F16H 57/0489* (2013.01); *F16K 11/07* (2013.01)

(58) Field of Classification Search
CPC ..... F16K 11/07; F16K 27/041; F16H 61/0009
See application file for complete search history.

(56) References Cited

U.S. PATENT DOCUMENTS

| | | | | |
|---|---|---|---|---|
| 4,711,265 A | * | 12/1987 | Davis | ................. F16H 61/0009 137/454.2 |
| 2004/0000658 A1 | * | 1/2004 | Wayman | ................. F16K 11/07 251/321 |
| 2009/0105020 A1 | * | 4/2009 | Shioiri | ............. F16H 61/66272 474/28 |
| 2015/0292634 A1 | * | 10/2015 | Jackson | .................... B23P 6/00 251/324 |
| 2016/0025210 A1 | * | 1/2016 | Kujawski, Jr. | ...... F16H 61/0009 137/315.01 |
| 2018/0283564 A1 | * | 10/2018 | Hara | ....................... F16K 11/07 |

FOREIGN PATENT DOCUMENTS

JP 2015215069 12/2015

* cited by examiner

*Primary Examiner* — Paul J Gray
(74) *Attorney, Agent, or Firm* — JCIPRNET

(57) ABSTRACT

Provided is a pressure control apparatus in which workability in assembly of a body, a spool valve, a retainer, and an elastic member is improved and a high degree of freedom in a design of installation of the spool valve is obtained. A pressure control apparatus includes: a body having an opening portion penetrating a wall portion which demarcates a spool hole; a spool valve that is disposed displaceably in the spool hole; a plate-shaped retainer disposed at one end side of the spool valve in an axial direction in the spool hole; and an elastic member 6 disposed between the spool valve in the spool hole and the retainer. The retainer has a wide portion and a narrow portion. The opening portion has a first opening portion that allows the retainer to pass through and a second opening portion that inhibits the retainer from passing through.

20 Claims, 4 Drawing Sheets

PRESSURE CONTROL APPARATUS

CROSS-REFERENCE TO RELATED APPLICATION

This application claims the priority of Japan patent application serial no. 2018-164726, filed on Sep. 3, 2018. The entirety of the above-mentioned patent application is hereby incorporated by reference herein and made a part of this specification.

BACKGROUND OF THE DISCLOSURE

Technical Field

The disclosure relates to a pressure control apparatus.

Related Art

Transport equipment such as an automobile includes a control valve apparatus that controls driving of a transmission by supplying oil to the transmission (for example, see Japanese Laid-Open No. 2015-215069). The control valve apparatus disclosed in Japanese Laid-Open No. 2015-215069 includes a valve body having a flow channel through which oil passes and a spool hole connected to the flow channel, a spool valve that is arranged in the spool hole and switches opening and closing of the flow channel, a coil spring that is arranged, together with the spool valve, in the spool hole and presses the spool valve toward a direction in which the flow channel is closed, and a retainer disposed at an opposite side of a pressing direction of the coil spring.

In addition, in the control valve apparatus disclosed in Japanese Laid-Open No. 2015-215069, a through hole into which the retainer is inserted is arranged in a wall portion that demarcates the spool hole. Consequently, the retainer is in a state of being disposed at the body. Besides, in the valve body in a state that the retainer is disposed in the valve body, a lid is screwed from a side at which the retainer is inserted, and thereby the retainer is prevented from falling off the valve body.

LITERATURE OF RELATED ART

Patent Literature

[Patent literature 1] Japanese Laid-Open Publication No. 2015-215069

In the control valve apparatus disclosed in Japanese Laid-Open No. 2015-215069, for example, in a case of replacing the coil spring, a screw with which the lid is fixed to the valve body is first unfastened, and then the lid is removed. Subsequently, the retainer is pulled out of the through hole, and the coil spring is taken out of the spool valve. In this way, disassembly of members for replacement of the coil spring is performed. In addition, assembly work of the members after the replacement of the coil spring is performed through work in reverse order of disassembly work described above.

In general, in reassembly of an equipment structure, it is preferable that the number of components to be assembled is as small as possible. However, in the control valve apparatus disclosed in Japanese Laid-Open No. 2015-215069, as known from the work process described above, it is hard to say that the number of components to be assembled in the reassembly is small.

In addition, in the control valve apparatus disclosed in Japanese Laid-Open No. 2015-215069, the lid is required to prevent the retainer from falling off the valve body, and thereby there is a limit to an installing position of the spool valve in a design of installation of the spool valve.

SUMMARY

An embodiment of the pressure control apparatus of the disclosure includes: a body having a flow channel through which a fluid passes, a columnar spool hole connected to the flow channel, and an opening portion penetrating a wall portion which demarcates the spool hole; a spool valve that is disposed displaceably along an axial direction in the spool hole and opens and closes the flow channel; a plate-shaped retainer disposed at one end side of the spool valve in the axial direction in the spool hole; and an elastic member that is disposed between the spool valve in the spool hole and the retainer, presses the spool valve toward another end side in the axial direction, and presses the retainer toward the one end side in the axial direction. The retainer has a wide portion that functions as a spring seat with which one end portion of the elastic member in the axial direction comes into contact and a narrow portion that extends from the wide portion in a first orthogonal direction orthogonal to the axial direction and has a width narrower than a width of the wide portion. The opening portion has a first opening portion that has an opening width in a second orthogonal direction orthogonal to the axial direction being wider than the width of the wide portion and that allows the retainer to pass through, and a second opening portion that is connected to the first opening portion at one end side in the axial direction, has an opening width in the second orthogonal direction being narrower than the width of the wide portion, and inhibits the retainer from passing through.

DESCRIPTION OF THE EMBODIMENTS

The disclosure provides a pressure control apparatus by which workability in assembly of a body, a spool valve, a retainer, and an elastic member is improved and a high degree of freedom in a design of installation of the spool valve is obtained.

According to one embodiment of the disclosure, workability in assembly of a body, a spool valve, a retainer, and an elastic member is improved, and a high degree of freedom in a design of installation of the spool valve is obtained.

A pressure control apparatus of the disclosure is described below in detail based on an embodiment illustrated in the accompanying drawings. Hereinafter, as illustrated in FIGS. 1 to 5, three axes orthogonal to each other are an X axis, a Y axis, and a Z axis, for convenience of description. As an example, an XY plane including the X axis and the Y axis is horizontal, and the Z axis is vertical. In addition, a direction at which an arrow of each direction points is referred to as "positive", and an opposite direction thereof is referred to as "negative". Moreover, a positive side in the Z-axis direction may be referred to as "upper" or "above", and a negative side in the Z-axis direction may be referred to as "lower" or "below". In addition, a negative side in the Y-axis direction corresponds to "one end side in axial direction", and a positive side in the Y-axis direction corresponds to "the other end side in axial direction".

Figure 1:
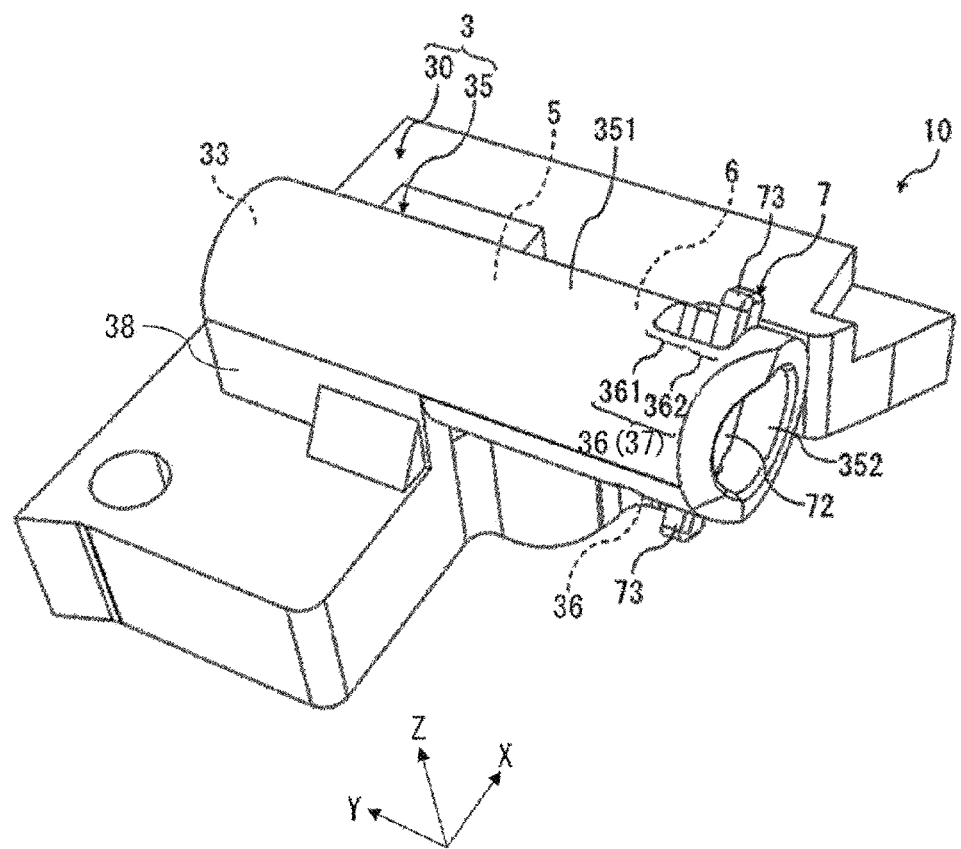
FIG. 1 is a perspective view of a pressure control apparatus of the disclosure viewed from above.

A pressure control apparatus 10 illustrated in FIG. 1 is an apparatus that is mounted on, for example, transport equipment such as an automobile, and controls a pressure of oil (automatic transmission fluid (ATF)) which is supplied to a continuously variable transmission in the transport equipment, thereby driving the continuously variable transmission.

Moreover, in the embodiment, the pressure control apparatus 10 is applied to an oil-pressure control apparatus that controls the pressure of oil; however, the application is not limited thereto. Examples of apparatuses to which the pressure control apparatus 10 can be applied include, in addition to the hydraulic-pressure control apparatus, a water-pressure control apparatus that controls the pressure of water, a pneumatic-pressure control apparatus that controls the pressure of air, or the like. In this case, a substance that passes through the pressure control apparatus 10 is a fluid such as oil, water, or air, which are collectively referred to as a "fluid Q" in the following description.

The pressure control apparatus 10 includes a body 3, a spool valve 5, an elastic member 6, and a retainer 7.

The body 3 has a main body portion 30 being a plate shape and a tubular portion 35 projecting in a tubular shape on the main body portion 30. Moreover, a constituent material of the body 3 is not particularly limited and may be a metallic material such as aluminium. When the body 3 is formed of aluminium, the body 3 may be manufactured by die-casting, for example.

Figure 2:
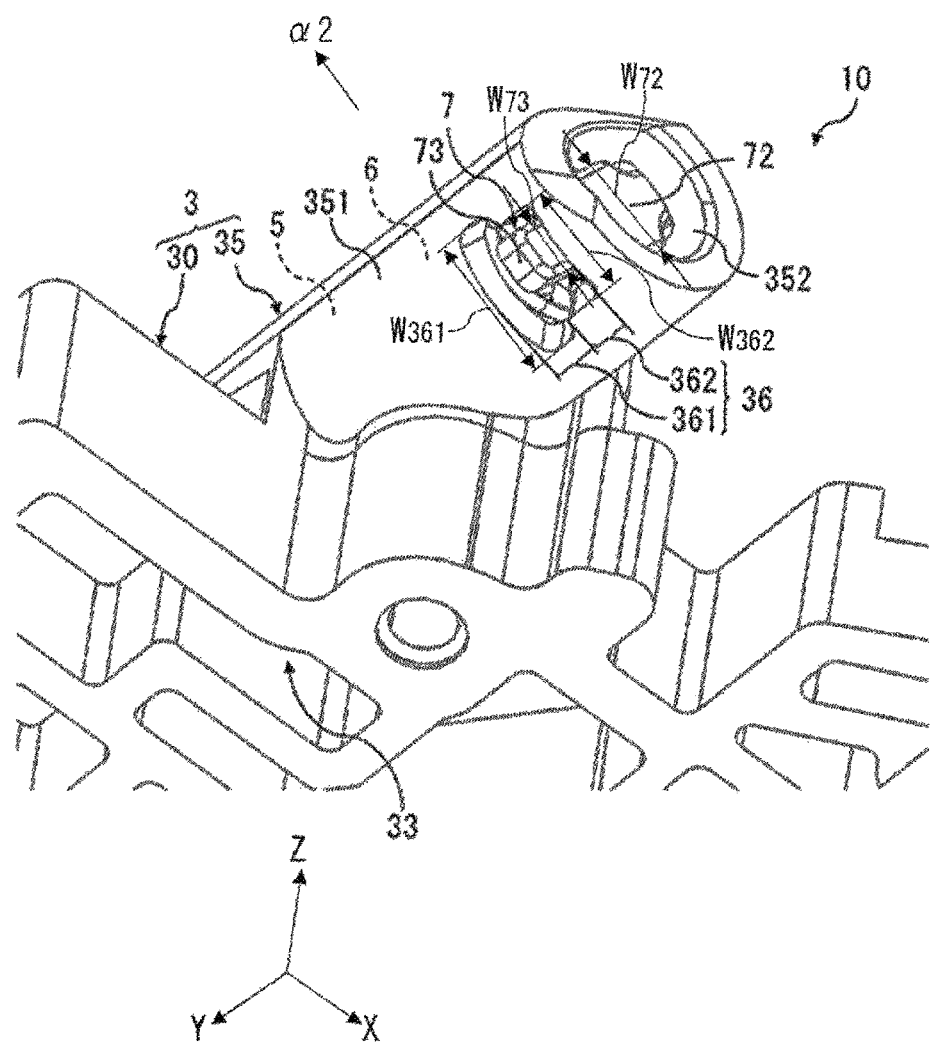
FIG. 2 is a perspective view of the pressure control apparatus illustrated in FIG. 1, when viewed from below.

As illustrated in FIGS. 1 and 2, in the embodiment, the main body portion 30 is disposed along the XY plane.

Figure 3:
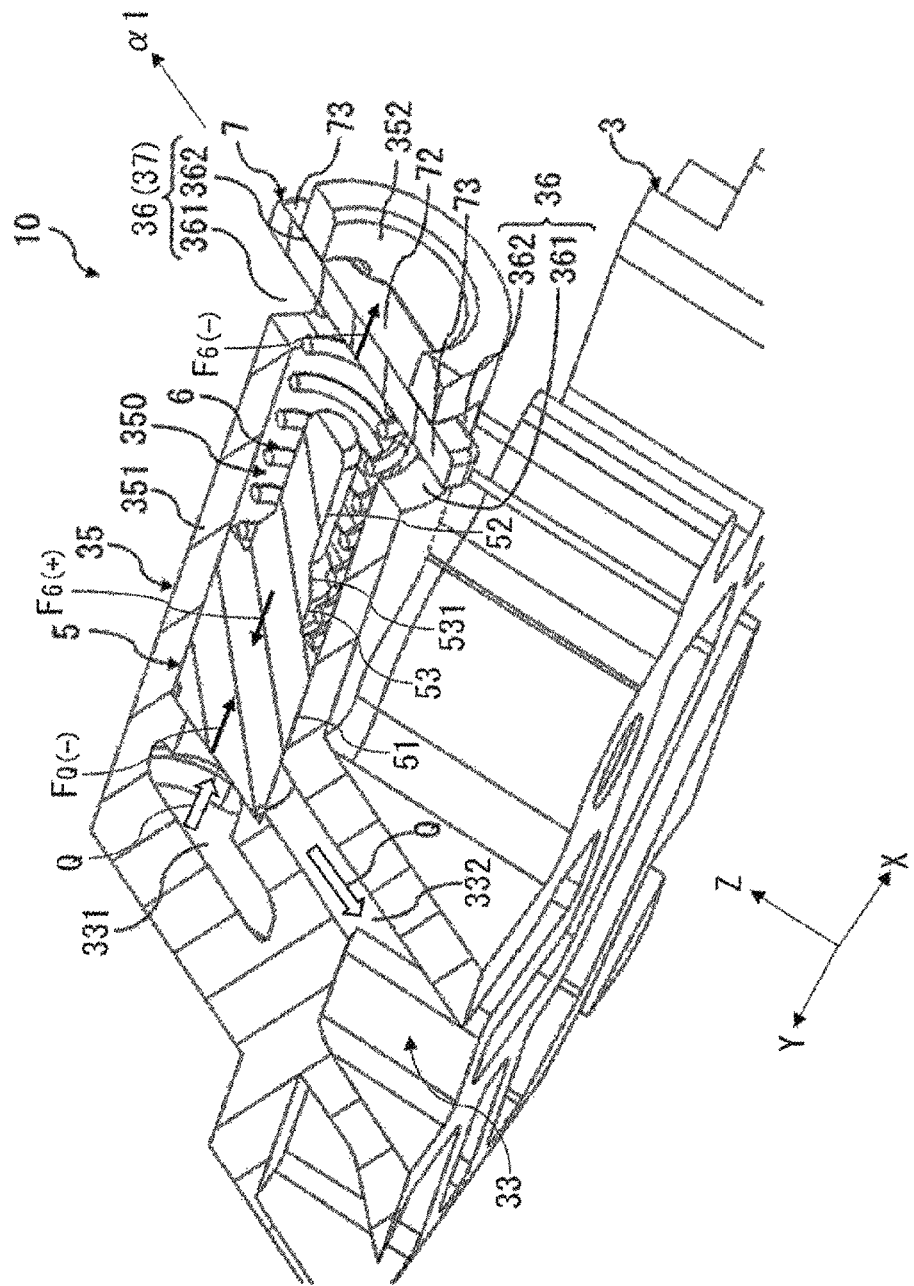
FIG. 3 is a longitudinal-sectional perspective view of the pressure control apparatus illustrated in FIG. 1.

As illustrated in FIG. 3, the main body portion 30 has a flow channel 33 through which the fluid Q passes. The flow channel 33 includes a first flow channel 331 and a second flow channel 332 intersecting with each other. In a process in which the fluid Q passes through the first flow channel 331 and the second flow channel 332 in this order, a passing direction thereof is changed.

Moreover, although not illustrated, the body 3 has a lid (separate plate) that covers the flow channel 33 of the main body portion 30 from the negative side in the Z-axis direction. Consequently, the fluid Q is prevented from leaking out of the flow channel 33 when passing through the flow channel 33. In addition, an oil pump mat be connected to the flow channel 33 via a solenoid valve.

Figure 4:
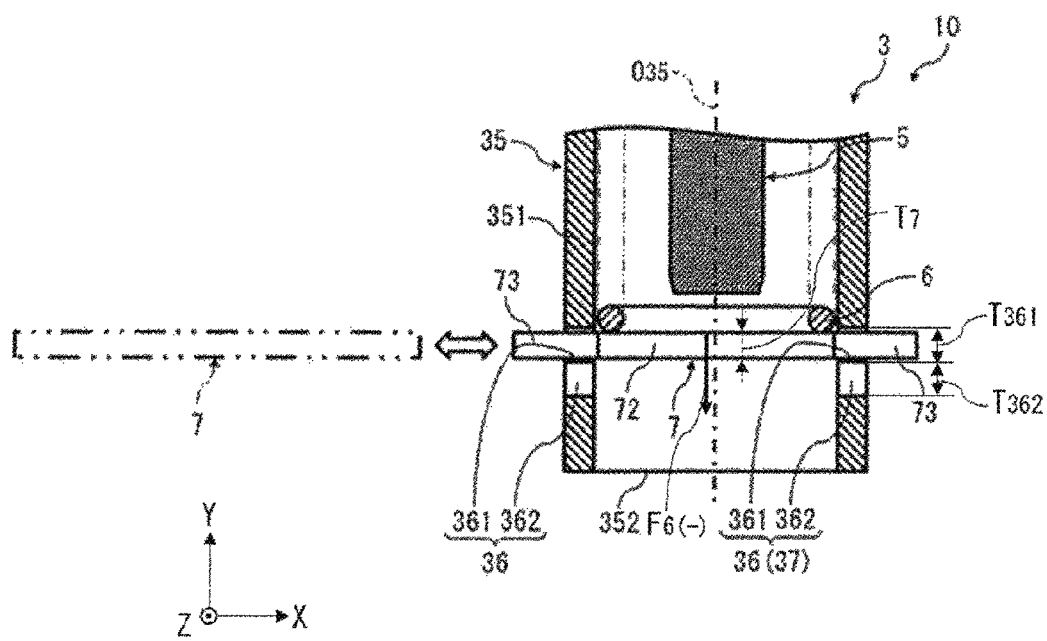
FIG. 4 is a longitudinal-sectional view illustrating an assembly process of the pressure control apparatus illustrated in FIG. 1 in order.
Figure 5:
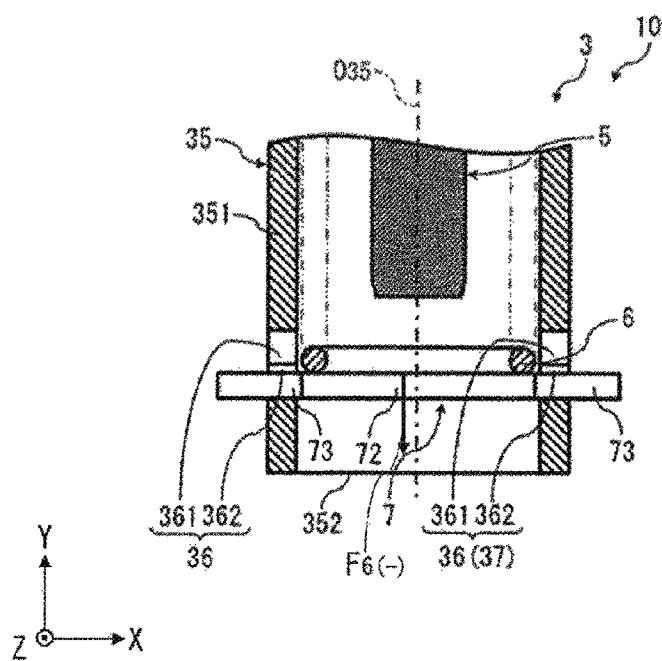
FIG. 5 is a longitudinal-sectional view illustrating the assembly process of the pressure control apparatus illustrated in FIG. 1 in order.

As illustrated in FIG. 1, the tubular portion 35 is disposed on the main body portion 30. The tubular portion 35 is coupled to the main body portion 30 via a coupling portion 38. As illustrated in FIGS. 4 and 5, in the embodiment, the tubular portion 35 has a tubular shape and has a central axis $O_{35}$ disposed parallel to the Y-axis direction.

As illustrated in FIG. 3, the tubular portion 35 has a wall portion 351 that demarcates a spool hole 350 connected to the first flow channel 331 and the second flow channel 332 at the positive side in the Y-axis direction (the other side in the axial direction). The spool hole 350 has a circular columnar shape, and the spool valve 5 is disposed displaceably in the Y-axis direction. In addition, a large opening portion 352 is open at the negative side of the tubular portion 35 in the Y-axis direction.

In this manner, the body 3 has the flow channel 33 through which the fluid Q passes and the spool hole 350 connected to the flow channel 33. Besides, the flow channel 33 is demarcated by the main body portion 30, and the spool hole 350 is demarcated by the tubular portion 35.

The spool valve 5 is displaceable along the Y-axis direction in the spool hole 350 corresponding to the pressure in the flow channel 33. Besides, the displacement enables the flow channel 33 to be opened or closed.

The spool valve 5 has a circular columnar shape in which an outer diameter changes along the Y-axis direction. In the embodiment, the spool valve 5 has a large-diameter portion 51 having a maximum outer diameter at the positive side in the Y-axis direction, a small-diameter portion 52 having a minimum outer diameter at the negative side in the Y-axis direction (one end side in the axial direction), and an intermediate portion 53 having an intermediate outer diameter between the large-diameter portion 51 and the small-diameter portion 52. In addition, the intermediate portion 53 has a tapered portion 531 having a taper shape in which the outer diameter gradually decreases toward a side of the small-diameter portion 52.

In a state illustrated in FIG. 3, the large-diameter portion 51 is positioned between the first flow channel 331 and the second flow channel 332. Consequently, the first flow channel 331 and the second flow channel 332 are blocked from each other, the flow channel 33 is in a closed state, and the fluid Q stops passing from the first flow channel 331 to the second flow channel 332.

On the other hand, in a state that the spool valve 5 is displaced from the state illustrated in FIG. 3 toward the negative side in the Y-axis direction, the blocking between the first flow channel 331 and the second flow channel 332 by the large-diameter portion 51 is released. Consequently, the flow channel 33 is in an opened state, and thereby the fluid Q can pass from the first flow channel 331 to the second flow channel 332.

Moreover, the shape of the spool valve 5 is not limited to the circular columnar shape and may be a rectangular columnar shape. In this case, the spool hole 350 also has the same rectangular columnar shape as the shape of the spool valve 5.

In addition, the pressure control apparatus 10 may include a detection unit that detects a position of the spool valve 5 in the spool hole 350.

The elastic member 6 is disposed in the spool hole 350 at the negative side of the spool valve 5 in the Y-axis direction. The elastic member 6 is configured by a coil spring spirally wound around the central axis $O_{35}$ of the tubular portion 35. The elastic member 6 comes into contact with the large-diameter portion 51 of the spool valve 5 at the positive side in the Y-axis direction and comes into contact with the retainer 7 at the negative side in the Y-axis direction, and the elastic member 6 is in a compressed state between the large-diameter portion 51 and the retainer 7. Consequently, it is possible to press the spool valve 5 toward the positive side in the Y-axis direction, and it is possible to press the retainer 7 toward the negative side in the Y-axis direction. Hereinafter, a force by which the elastic member 6 presses the spool valve 5 toward the positive side in the Y-axis direction is referred to as a "force $F_{6(+)}$", and a force by which the elastic member 6 presses the retainer 7 toward the negative side in the Y-axis direction is referred to as a "force $F_{6(-)}$" (see FIG. 3).

In addition to the force $F_{6(+)}$, a force of the fluid Q that flows down from the first flow channel 331, that is, a force $F_{Q(-)}$ of the fluid Q directed toward the negative side in the Y-axis direction, acts on the spool valve 5. When the force $F_{Q(-)}$ is larger than the force $F_{6(+)}$, the spool valve 5 is displaceable toward the negative side in the Y-axis direction to cause the flow channel 33 to be in the opened state. On the contrary, when the force $F_{6(+)}$ is larger than the force $F_{Q(-)}$, the spool valve 5 is displaceable toward the positive side in the Y-axis direction to cause the flow channel 33 to be in the closed state.

In addition, the intermediate portion 53 and the small-diameter portion 52 of the spool valve 5 are inserted into the elastic member 6. Consequently, the elastic member 6 is supported between the intermediate portion 53 and the small-diameter portion 52 at an inner side and the wall portion 351 at an outer side so as to be prevented from buckling. Hence, the elastic member can be stably extended and contracted.

As illustrated in FIG. 3, the body 3 has a pair of opening portions 36 that penetrates the wall portion 351 of the tubular portion 35. The retainer 7 can be continuously inserted into the opening portions 36.

The retainer 7 is disposed at the negative side of the spool valve 5 in the Y-axis direction in the spool hole 350 via the elastic member 6.

The retainer 7 has a plate shape with a uniform thickness $T_7$ (see FIG. 4) and has a wide portion 72 having a maximum width and narrow portions 73 having a width narrower than the width of the wide portion 72.

The wide portion 72 functions as a spring seat with which an end portion of the elastic member 6 at the negative side in the Y-axis direction comes into contact.

The narrow portions 73 extend from the wide portion 72 in a first orthogonal direction $\alpha 1$ orthogonal to the Y-axis direction. The narrow portions 73 come into contact with edge portions of the opening portions 36 at the negative side of the opening portion 36 in the Y-axis direction. The retainer 7 is pressed by the elastic member 6 toward the negative side in the Y-axis direction and the narrow portions 73 come into contact with the edge portions of the opening portions 36, and thereby a movement limit toward the negative side in the Y-axis direction is restricted. In addition, the narrow portions 73 project out of the opening portions 36. Consequently, for example, when the retainer 7 needs to be pulled out of the opening portions 36, the narrow portions 73 can be gripped to easily perform the pulling-out operation. In the embodiment, a pair of narrow portions 73 is disposed at mutually opposite sides with the wide portion 72 interposed therebetween. Consequently, when the retainer 7 is inserted into the opening portions 36 to assemble the body 3 and the retainer 7, the retainer 7 can be inserted from any one of the pair of narrow portions 73 into the opening portions 36, and assembly workability is improved. In addition, after the assembly, each narrow portion 73 of the retainer 7 can come into contact with the edge portion of each of the opening portions 36, and thereby the retainer 7 is stably disposed at the body 3.

Moreover, a predetermined ratio is set between a width $W_{72}$ of the wide portion 72 and a width $W_{73}$ of the narrow portion 73, and a predetermined ratio is set between a length of the wide portion 72 along the first orthogonal direction $\alpha 1$ and a diameter of the spool hole 350. Accordingly, the retainer 7 is prevented from inadvertently falling out of a second opening portion 362, which will be described below, of the opening portion 36.

As described above, the wall portion 351 of the tubular portion 35 has a pair of opening portions 36 into which the retainer 7 is continuously inserted. As illustrated in FIGS. 4 and 5, the pair of opening portions 36 is disposed at right and left sides in the drawings with the central axis $O_{35}$ interposed therebetween, that is, disposed symmetrically with respect to the central axis $O_{35}$. The pair of opening portions 36 has the same configuration except that installation positions are different from each other, and thus one opening portion 36 is representatively described.

As illustrated in FIG. 2, the opening portion 36 includes a first opening portion 361 and the second opening portion 362 that is connected to the first opening 361 at the negative side in the Y-axis direction.

An opening width $W_{361}$ of the first opening portion 361 along a second orthogonal direction $\alpha 2$ orthogonal to the Y-axis direction is larger than the width $W_{72}$ of the wide portion 72. In addition, as illustrated in FIG. 4, an opening thickness $T_{361}$ of the first opening portion 361 along the Y-axis direction is larger than the thickness $T_7$ of the retainer 7. The first opening portion 361 having such sizes allows the retainer 7 to pass through.

An opening width $W_{362}$ of the second opening portion 362 along the second orthogonal direction $\alpha 2$ is smaller than the width $W_{72}$ of the wide portion 72 and larger than the width $W_{73}$ of the narrow portion 73.

As illustrated in FIG. 4, an opening thickness $1362$ of the second opening portion 362 along the Y-axis direction is larger than the thickness $T_7$ of the retainer 7. Moreover, the opening thickness $1362$ may have the same size as that of the opening thickness $T_{361}$; however, the opening thickness $T_{362}$ may have a size different from that of the opening thickness $T_{361}$.

The second opening portion 362 having the above sizes can prevent the retainer 7 from passing through the second opening portion 362.

Moreover, in the embodiment, the second orthogonal direction $\alpha 2$ is a direction orthogonal to the first orthogonal direction $\alpha 1$.

Next, a process of assembling the body 3, the spool valve 5, the elastic member 6, and the retainer 7 is described with reference to FIGS. 4 and 5.

First, as illustrated in FIG. 4, a state is formed in which the spool valve 5 is inserted into the tubular portion 35 of the body, that is, into the spool hole 350, from a side of the large-diameter portion 51, and the elastic member 6 is further inserted.

Then, the elastic member 6 is pushed toward the positive side in the Y-axis direction to form a state in which the elastic member 6 goes beyond the first opening portions 361 of the opening portions 36 at the positive side in the Y-axis direction. Then, while the state is maintained, the retainer 7 is inserted into the first opening portion 361 of one opening portion 36 (at the left side in FIG. 4) of the pair of opening portions 36. As described above, the first opening portion 361 allows the retainer 7 to pass through. Consequently, the insertion of the retainer 7 can be smoothly performed.

Hence, when the insertion of the retainer 7 further proceeds, the narrow portion 73 of the retainer 7 projects out of the first opening portion 361 of the other opening portion 36 (at the right side in FIG. 4), and the wide portion 72 is positioned in the spool hole 350. In this case, the narrow portion 73 of the retainer 7 also projects out of the first opening portion 361 of the one opening portion 36.

Subsequently, a force by which the elastic member 6 is pushed toward the positive side in the Y-axis direction is removed, and thereby the force $F_{6(-)}$ from the elastic member 6 acts on the retainer 7, as illustrated in FIG. 5. Consequently, the retainer 7 moves toward the negative side in the Y-axis direction to the second opening portions 362 and comes into contact with edge portions of the second opening portions 362 which is a movement limit of the retainer. In addition, in a state in which the retainer 7 is positioned at the second opening portions 362, a part of each of the narrow portions 73 is accommodated in each of the second opening portions 362, and the wide portion 72 is disposed between the two second opening portions 362. Consequently, as described above, the retainer 7 is inhibited from passing through the second opening portion 362, and thereby the retainer 7 is prevented from falling off the body 3.

Moreover, for example, when the elastic member 6 needs to be replaced, it is necessary to disassemble the body 3, the spool valve 5, the elastic member 6, and the retainer 7; however, the disassembly work can be implemented by performing work in reverse order of the assembly work described above.

As described above, in the pressure control apparatus 10, the retainer 7 can be prevented from falling off the body 3 by a simple configuration in which the retainer 7 is disposed at the second opening portions 362 having a narrow opening width $W_{362}$. Consequently, for example, a falling prevention member of the retainer 7 is not additionally arranged, and thereby it is unnecessary to consider an installation position or the like of the falling prevention member when the installation of the spool valve 5 is designed, and a high degree of freedom of design is obtained.

In addition, because the falling prevention member can be omitted, the number of components which is required in the assembly of the body 3, the spool valve 5, the elastic member 6, and the retainer 7 can be reduced correspondingly. Consequently, the assembly can be rapidly performed, and thereby the assembly workability is improved.

In addition, in the pressure control apparatus 10, one opening portion 36 of the pair of opening portions 36 functions as an assembly insertion port into which the retainer 7 is inserted in the assembly. The other opening portion 36 functions as a restriction portion 37 that restricts the movement of the retainer 7, which is positioned at the second opening portion 362, toward the negative side in the Y-axis direction, that is, restricts the position of the retainer 7 after the retainer 7 is inserted into the opening portion 36. Moreover, the one opening portion 36 can also functions as the restriction portion 37. The above restriction portion 37 enables the retainer 7 to be stably disposed at the body 3.

Moreover, the restriction portion 37 which is the other opening portion 36 is not limited to the opening portion 36 penetrating the wall portion 351 and may be a recessed portion that does not penetrate the wall portion 351.

In this case, the narrow portion 73 of the retainer 7 at the side of the restriction portion 37 is caught at the restriction portion 37. In addition, in this case, it is also possible to omit the narrow portion 73 at the side of the restriction portion 37 and make an edge portion of the wide portion 72 be caught at the restriction portion 37.

As described above, the pressure control apparatus of the disclosure is described on the basis of the embodiment in the drawings; however, the disclosure is not limited thereto, and elements that configure the pressure control apparatus can be replaced with elements having any configuration and being capable of exhibiting the same functions. In addition, any structure may be added.

What is claimed is:

1. A pressure control apparatus comprising:
   a body having:
      a flow channel through which a fluid passes,
      a columnar spool hole connected to the flow channel, wherein a large opening portion is provided at one end side of the spool hole in an axial direction, and
      an opening portion penetrating a wall portion which demarcates the spool hole;
   a spool valve that is disposed displaceably along the axial direction in the spool hole and opens and closes the flow channel;
   a plate-shaped retainer disposed at one end side of the spool valve and another end side of the large opening portion in the axial direction in the spool hole; and
   an elastic member that is disposed between the spool valve in the spool hole and the retainer, presses the spool valve toward another end side in the axial direction, and presses the retainer toward the one end side in the axial direction;
   wherein the retainer has a wide portion that functions as a spring seat with which one end portion of the elastic member in the axial direction comes into contact and at least one narrow portion that extends from the wide portion in a first orthogonal direction orthogonal to the axial direction and has a width narrower than a width of the wide portion, and
   wherein the opening portion has a first opening portion that has an opening width in a second orthogonal direction orthogonal to the axial direction being wider than the width of the wide portion and allows the retainer to pass through, and a second opening portion that is connected to the first opening portion at one end side in the axial direction, the second opening portion has an opening width in the second orthogonal direction being narrower than the width of the wide portion, and inhibits the retainer from passing through.

2. The pressure control apparatus according to claim 1, wherein, in a state that the retainer is positioned at the second opening portion, the narrow portion is accommodated in the second opening portion.

3. The pressure control apparatus according to claim 1, wherein the wall portion has a restriction portion that restricts movement of the retainer positioned at the second opening portion toward one end side in the axial direction.

4. The pressure control apparatus according to claim 2, wherein the wall portion has a restriction portion that restricts movement of the retainer positioned at the second opening portion toward one end side in the axial direction.

5. The pressure control apparatus according to claim 1, wherein the at least one narrow portion comprises a pair of narrow portions disposed at mutually opposite sides with the wide portion interposed between the pair of narrow portions.

6. The pressure control apparatus according to claim 2, wherein the at least one narrow portion comprises a pair of narrow portions disposed at mutually opposite sides with the wide portion interposed between the pair of narrow portions.

7. The pressure control apparatus according to claim 3, wherein the at least one narrow portion comprises a pair of narrow portions disposed at mutually opposite sides with the wide portion interposed between the pair of narrow portions.

8. The pressure control apparatus according to claim 4, wherein the at least one narrow portion comprises a pair of narrow portions disposed at mutually opposite sides with the wide portion interposed between the pair of narrow portions.

9. The pressure control apparatus according to claim 5, wherein the wall portion has a restriction portion that restricts movement of the retainer positioned at the second opening portion toward one end side in the axial direction, and
wherein the restriction portion is an opening portion which penetrates the wall portion at an opposite side of the second opening portion with a central axis of the wall portion interposed between the opening portion and the second opening portion and in which one of the pair of narrow portions is accommodated.

10. The pressure control apparatus according to claim 6, wherein the wall portion has a restriction portion that restricts movement of the retainer positioned at the second opening portion toward one end side in the axial direction, and
wherein the restriction portion is an opening portion which penetrates the wall portion at an opposite side of the second opening portion with a central axis of the wall portion interposed between the opening portion and the second opening portion and in which one of the pair of narrow portions is accommodated.

11. The pressure control apparatus according to claim 7, wherein the wall portion has a restriction portion that restricts movement of the retainer positioned at the second opening portion toward one end side in the axial direction, and
wherein the restriction portion is an opening portion which penetrates the wall portion at an opposite side of the second opening portion with a central axis of the wall portion interposed between the opening portion and the second opening portion and in which one of the pair of narrow portions is accommodated.

12. The pressure control apparatus according to claim 8, wherein the wall portion has a restriction portion that restricts movement of the retainer positioned at the second opening portion toward one end side in the axial direction, and
wherein the restriction portion is an opening portion which penetrates the wall portion at an opposite side of the second opening portion with a central axis of the wall portion interposed between the opening portion and the second opening portion and in which one of the pair of narrow portions is accommodated.

13. The pressure control apparatus according to claim 1, wherein the body has a main body portion that demarcates the flow channel and a tubular portion that is defined by the wall portion and projects on the main body portion.

14. The pressure control apparatus according to claim 2, wherein the body has a main body portion that demarcates the flow channel and a tubular portion that is defined by the wall portion and projects on the main body portion.

15. The pressure control apparatus according to claim 3, wherein the body has a main body portion that demarcates the flow channel and a tubular portion that is defined by the wall portion and projects on the main body portion.

16. The pressure control apparatus according to claim 4, wherein the body has a main body portion that demarcates the flow channel and a tubular portion that is defined by the wall portion and projects on the main body portion.

17. The pressure control apparatus according to claim 5, wherein the body has a main body portion that demarcates the flow channel and a tubular portion that is defined by the wall portion and projects on the main body portion.

18. The pressure control apparatus according to claim 6, wherein the body has a main body portion that demarcates the flow channel and a tubular portion that is defined by the wall portion and projects on the main body portion.

19. The pressure control apparatus according to claim 9, wherein the body has a main body portion that demarcates the flow channel and a tubular portion that is defined by the wall portion and projects on the main body portion.

20. The pressure control apparatus according to claim 10, wherein the body has a main body portion that demarcates the flow channel and a tubular portion that is defined by the wall portion and projects on the main body portion.

* * * * *